(12) United States Patent
Sminchisescu et al.

(10) Patent No.: US 11,836,221 B2
(45) Date of Patent: Dec. 5, 2023

(54) SYSTEMS AND METHODS FOR REFINED OBJECT ESTIMATION FROM IMAGE DATA

(71) Applicant: Google LLC, Mountain View, CA (US)

(72) Inventors: Cristian Sminchisescu, Zurich (CH); Andrei Zanfir, Zurich (CH); Eduard Gabriel Bazavan, Adliswil (CH); Mihai Zanfir, Bucharest (RO); William Tafel Freeman, Acton, MA (US); Rahul Sukthankar, Orlando, FL (US)

(73) Assignee: GOOGLE LLC, Mountain View, CA (US)

( * ) Notice: Subject to any disclaimer, the term of this patent is extended or adjusted under 35 U.S.C. 154(b) by 315 days.

(21) Appl. No.: 17/200,643

(22) Filed: Mar. 12, 2021

(65) Prior Publication Data

US 2022/0292314 A1 Sep. 15, 2022

(51) Int. Cl.
*G06F 18/21* (2023.01)
*G06V 40/10* (2022.01)
*G06T 7/73* (2017.01)
*G06N 3/08* (2023.01)

(52) U.S. Cl.
CPC ............ *G06F 18/217* (2023.01); *G06N 3/08* (2013.01); *G06T 7/73* (2017.01); *G06V 40/103* (2022.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 11,074,711 B1* | 7/2021 | Akbas | G06V 10/454 |
| 2020/0285274 A1* | 9/2020 | Lin | G06F 1/16 |
| 2021/0287096 A1* | 9/2021 | Patney | G06T 7/0012 |

FOREIGN PATENT DOCUMENTS

WO WO-2020099338 A1 * 5/2020 ......... G06K 9/00201

OTHER PUBLICATIONS

Andrychowcz et al., "Learning to learn by gradient descent by gradient descent", 2016 Conference on Neural Information Processing Systems, Dec. 5-10, 2016, Barcelona, Spain, 9 pages.
Arnab et al., "Exploiting temporal context for 3d human pose estimation in the wild", arXiv:1905.04266v1, May 10, 2019, 13 pages.

(Continued)

*Primary Examiner* — Vikkram Bali
(74) *Attorney, Agent, or Firm* — Dority & Manning, P.A.

(57) ABSTRACT

Systems and methods are directed to a method for estimation of an object state from image data. The method can include obtaining two-dimensional image data depicting an object. The method can include processing, with an estimation portion of a machine-learned object state estimation model, the two-dimensional image data to obtain an initial estimated state of the object. The method can include, for each of one or more refinement iterations, obtaining a previous loss value associated with a previous estimated state for the object, processing the previous loss value to obtain a current estimated state of the object, and evaluating a loss function to determine a loss value associated with the current estimated state of the object. The method can include providing a final estimated state for the object.

20 Claims, 8 Drawing Sheets

(56) References Cited

OTHER PUBLICATIONS

Bogo et al., "Keep it SMPL: Automatic Estimation of 3D Human Pose and Shape from a Single Image", European Conference on Computer Vision, Oct. 8-16, 2016, Amsterdam, The Netherlands, 18 pages.
Cao et al., "OpenPose: Realtime Multi-Person 2D Pose Estimation Using Part Affinity Fields", IEEE Transactions on Pattern Analysis and Machine Intelligence, vol. 43, No. 1, Jan. 2021, pp. 172-186.
Cao et al., "Realtime Multi-Person 2D Pose Estimation using Part Affinity Fields", 2017 IEEE Conference on Computer Vision and Pattern Recognition, Jul. 21-26, 2017, Honolulu, Hawaii, pp. 1302-1310.
Chen et al., "Learning to Learn without Gradient Descent by Gradient Descent", 2017 International Conference on Machine Learning, Aug. 6-11, 2017, Sydney, Australia, 9 pages.
Choutas et al., "Monocular Expressive Body Regression through Body-Driven Attention", 16th European Conference on Computer Vision, Aug. 23-28, 2020, Virtual, 21 pages.
Doersch et al., "Sim2real transfer learning for 3D human pose estimation: motion to the rescue", 2019 Conference on Neural Information Processing Systems, Dec. 8-14, 2019, Vancouver, Canada, 13 pages.
Guler et al., "DensePose: Dense Human Pose Estimation In The Wild", arXiv:1802.00434vl, Feb. 1, 2018, 12 pages.
He et al., "Identity Mappings in Deep Residual Networks", European Conference on Computer Vision, Oct. 8-16, 2016, Amsterdam, The Netherlands, pp. 630-645.
Hochreiter et al., "Long Short-Term Memory", Neural Computation, vol. 9, No. 8, 1997, 32 pages.
Hospedales et al., "Meta-Learning in Neural Networks: A Survey", arXiv:2004.05439v2, Nov. 7, 2020, 20 pages.
Ionescu et al., "Human3.6M: Large Scale Datasets and Predictive Methods for 3D Human Sensing in Natural Environments", IEEE Transactions on Pattern Analysis and Machine Intelligence, vol. 36, No. 7, Jul. 7, 2014, pp. 1325-1339.
Ionescu et al., "Iterated Second-Order Label Sensitive Pooling for 3D Human Pose Estimation", 2014 IEEE Conference on Computer Vision and Pattern Recognition (CVPR), Jun. 24-27, 2014, Columbus, Ohio, 8 pages.
Iskakov et al., "Learnable Triangulation of Human Pose", International Conference on Computer Vision, Oct. 27-Nov. 2, 2019, Seoul, Korea, pp. 7718-7727.
Jackson et al., "3D Human Body Reconstruction from a Single Image via Volumetric Regression", 15th European Conference on Computer Vision, Sep. 8-14, 2018, Munich, Germany, 14 pages.
Kanazawa et al., "End-to-end Recovery of Human Shape and Pose", 2018 Conference on Computer Vision and Pattern Recognition, Jun. 18-22, 2018, Salt Lake City, Utah, pp. 7122-7131.
Kanazawa et al., "Learning 3D Human Dynamics from Video", 2019 Conference on Computer Vision and Pattern Recognition, Jun. 16-20, 2019, Long Beach, CA, pp. 5614-5623.
Kocabas et al., "VIBE: Video Inference for Human Body Pose and Shape Estimation", 2020 Conference on Computer Vision and Pattern Recognition, Jun. 14-19, 2020, Virtual, pp. 5253-5263.
Kolotouros et al., "Convolutional Mesh Regression for Single-Image Human Shape Reconstruction", 2019 International Conference on Computer Vision, Oct. 27-Nov. 2, 2019, Seoul, Korea, pp. 4501-4510.
Kolotouros et al., "Learning to Reconstruct 3D Human Pose and Shape via Model-fitting in the Loop", 2019 International Conference on Computer Vision, Oct. 27-Nov. 2, 2019, Seoul, Korea, pp. 2252-2261.
Kuznetsova et al., "The Open Images Dataset V4: Unified image classification, object detection, and visual relationship detection at scale", arXiv:1811.00982v1, Nov. 2, 2018, 20 pages.
Lin et al., "Microsoft COCO: Common Objects in Context", 13th European Conference, Sep. 6- 12, 2014, Zurich, Switzerland, pp. 740-755.

Liu et al., "Soft Rasterizer: A Differentiable Renderer for Image-based 3D Reasoning", arXiv:1904.01786v1, Apr. 3, 2019, 15 pages.
Loper et al., "SMPL: A Skinned Multi-Person Linear Model", ACM Transaction on Graphics, vol. 34, No. 6, Article 248, Nov. 2015, pp. 248.1-248.16.
Lowe, "Distinctive Image Features from Scale-Invariant Key points", International Journal of Computer Vision, vol. 60, No. 2, 2004, pp. 91-110.
Martinez et al., "A simple yet effective baseline for 3d human pose estimation", 2017 International Conference on Computer Vision, Oct. 22-29, 2017, Venice, Italy, pp. 2640-2649.
Mehta et al., "VNect: Real-time 3D Human Pose Estimation with a Single RGB Camera", ACM Transactions on Graphics, vol. 36, No. 4, Article 44, Jul. 2017, pp. 44.1-44:14.
Omran et al., "Neural Body Fitting: Unifying Deep Learning and Model Based Human Pose and Shape Estimation", 2018 International Conference on 3D Vision, Sep. 5-8, 2018, Verona, Italy, pp. 484-494.
Pavlakos et al., "Coarse-to-Fine Volumetric Prediction for Single-Image 3D Human Pose", 2017 Conference on Computer Vision and Pattern Recognition, Jul. 21-26, 2017, Honolulu, Hawaii, pp. 7025-7034.
Popa et al., "Deep Multitask Architecture for Integrated 2D and 3D Human Sensing", 2017 Conference on Computer Vision and Pattern Recognition, Jul. 21-26, 2017, Honolulu, Hawaii, pp. 6289-6298.
Rhodin et al., "Unsupervised Geometry-Aware Representation for 3D Human Pose Estimation", 15th European Conference on Computer Vision, Sep. 8-14, 2018, Munich, Germany, 18 pages.
Rogez et al., "MoCap-guided Data Augmentation for 3D Pose Estimation in the Wild", 2016 Conference on Neural Information Processing Systems, Dec. 5-10, 2016, Barcelona, Spain, 9 pages.
Sminchisescu et al., "Estimating Articulated Human Motion With Covariance Scaled Sampling", International Journal of Robotics Research, vol. 22, No. 6, 2003, 24 pages.
Sminchisescu et al., "Kinematic Jump Processes For Monocular 3D Human Tracking", IEEE Computer Society Conference on Computer Vision and Pattern Recognition, Jun. 16-22, 2003, Madison, WI, 8 pages.
Sun et al., "Human Mesh Recovery from Monocular Images via a Skeleton-disentangled Representation", 2019 International Conference on Computer Vision, Oct. 27-Nov. 2, 2019, Seoul, Korea, pp. 5349-5358.
Tekin et al., "Learning to Fuse 2D and 3D Image Cues for Monocular Body Pose Estimation", 2017 International Conference on Computer Vision, Oct. 22-29, 2017, Venice, Italy, pp. 3941-3950.
Tian et al., "Regressing 3D Face Shapes from Arbitrary Image Sets with Disentanglement in Shape Space", 2019 International Conference on Biometrics (ICB), Jun. 4-7, 2019, Crete, Greece, 7 pages.
Trigeorgis et al., "Mnemonic Descent Method: A recurrent process applied for end-to-end face alignment", 2016 Conference on Computer Vision and Pattern Recognition, Jun. 26-Jul. 1, 2016, Las Vegas, NV, pp. 4177-4187.
Varol et al., "BodyNet: Volumetric Inference of 3D Human Body Shapes", 15th European Conference on Computer Vision, Sep. 8-14, 2018, Munich, Germany, 17 pages.
Von Marcard et al., "Recovering Accurate 3D Human Pose in The Wild Using IMUs and a Moving Camera", 15th European Conference on Computer Vision, Sep. 8-14, 2018, Munich, Germany, 17 pages.
Xiong et al., "Supervised Descent Method and its Applications to Face Alignment", 26th IEEE Conference on Computer Vision and Pattern Recognition, Jun. 23-28, 2013, Portland, Oregon, pp. 532-539.
Xu et al., "DenseRaC: Joint 3D Pose and Shape Estimation by Dense Render-and-Compare", 2019 International Conference on Computer Vision, Oct. 27-Nov. 2, 2019, Seoul, Korea, pp. 7760-7770.
Xu et al., "GHUM & GHUML: Generative 3D Human Shape and Articulated Pose Models", 2020 Conference on Computer Vision and Pattern Recognition, Jun. 14-19, 2020, Virtual, pp. 6183-6192.
Yang et al., "3D Human Pose Estimation in the Wild by Adversarial Learning", 2018 Conference on Computer Vision and Pattern Recognition, Jun. 18-22, 2018, Salt Lake City, Utah, pp. 5255-5264.

(56) References Cited

OTHER PUBLICATIONS

Zanfir et al., "Monocular 3D Pose and Shape Estimation of Multiple People in Natural Scenes The Importance of Multiple Scene Constraints", 2018 Conference on Computer Vision and Pattern Recognition, Jun. 18-22, 2018, Salt Lake City, Utah, 10 pages.

Zanfir et al., "Weakly Supervised 3D Human Pose and Shape Reconstruction with Normalizing Flows", 16TH European Conference on Computer Vision, Aug. 23-28, 2020, 17 pages.

Zhou et al., "On the Continuity of Rotation Representations in Neural Networks", arXiv:1812.07035v1, Dec. 17, 2018, 12 pages.

Zhou et al., "Towards 3D Human Pose Estimation in the Wild: a Weakly-supervised Approach", 2017 International Conference on Computer Vision, Oct. 22-29, 2017, Venice, Italy, pp. 398-407.

* cited by examiner

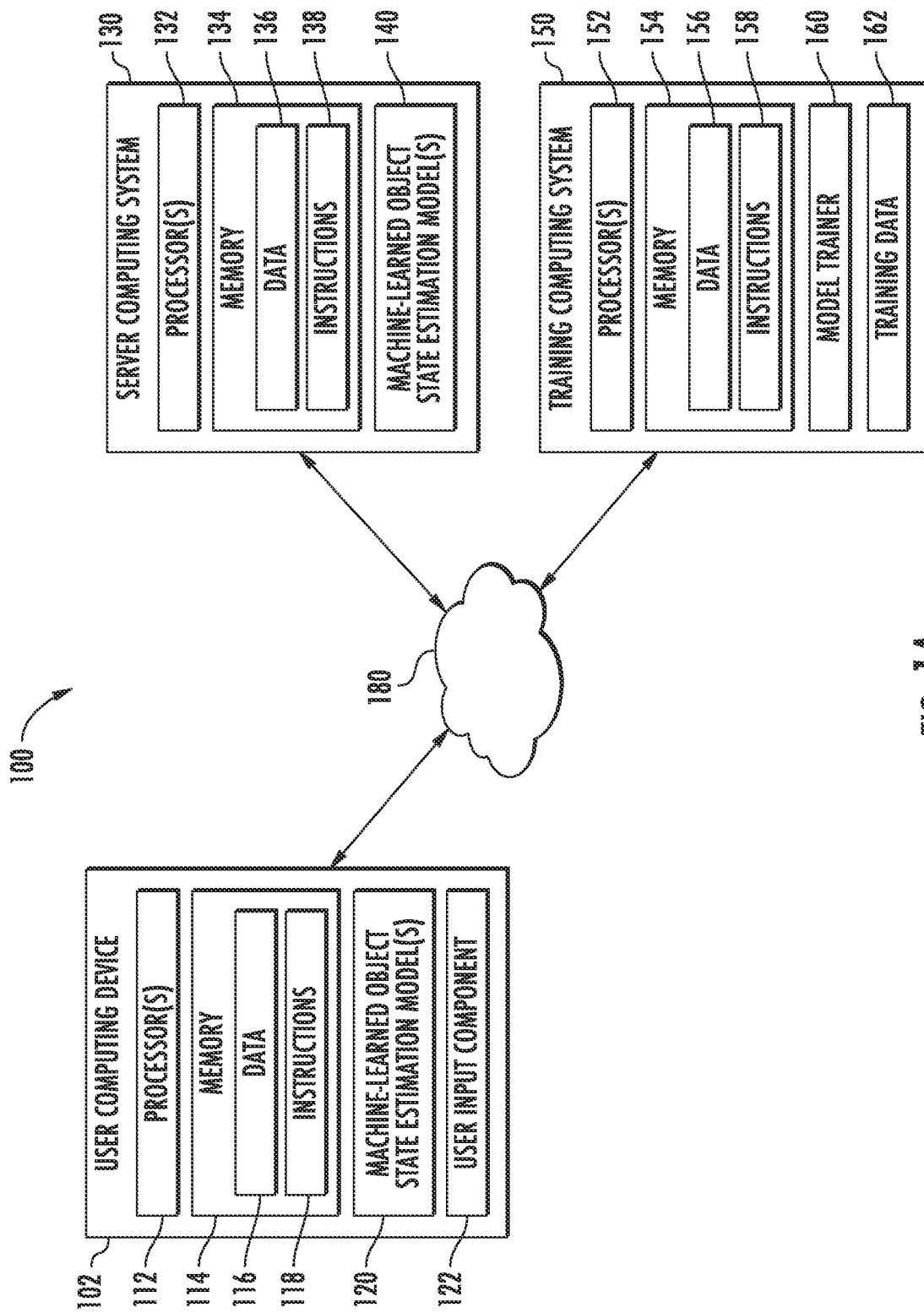

SYSTEMS AND METHODS FOR REFINED OBJECT ESTIMATION FROM IMAGE DATA

FIELD

The present disclosure relates generally to three-dimensional object estimation. More particularly, the present disclosure relates to end-to-end training and utilization of machine-learned model(s) for estimation of three-dimensional object states from two-dimensional image data.

BACKGROUND

The use of machine learning for automatic, three-dimensional object state estimation from images and/or video has the potential to transform a wide variety of industries (e.g., commerce, fitness, augmented reality, virtual reality, gaming, telepresence, remote work, etc.). The training and utilization of machine-learned models for this task has conventionally required the use of non-linear optimization alongside fully supervised training with annotated three-dimensional training data.

However, fully supervised non-linear optimization generally leads to an undesirable degree of complexity in the training and utilization of machine-learned models, and the collection or generation of annotated three-dimensional training data can be prohibitively expensive. As such, a model architecture that obviates the need for non-linear optimization and full training supervision represents a substantial improvement in the field of machine learned three-dimensional object state estimation.

SUMMARY

Aspects and advantages of embodiments of the present disclosure will be set forth in part in the following description, or can be learned from the description, or can be learned through practice of the embodiments.

One example aspect of the present disclosure is directed to A computer-implemented method for estimation of an object state from image data. The method can include obtaining, by a computing system comprising one or more computing devices, two-dimensional image data depicting an object. The method can include processing, by the computing system with an estimation portion of a machine-learned object state estimation model, the two-dimensional image data to obtain an initial estimated state of the object. The method can include, for each of one or more refinement iterations, obtaining, by the computing system, a previous loss value associated with a previous estimated state for the object. The method can include, for each of one or more refinement iterations, processing, by the computing system with a refinement portion of the machine-learned object state estimation model, the previous loss value to obtain a current estimated state of the object. The method can include, for each of one or more refinement iterations, evaluating, by the computing system, a loss function to determine a loss value associated with the current estimated state of the object. The method can include providing, by the computing system based at least in part on a final refinement iteration of the one or more refinement iterations, a final estimated state for the object.

Another example aspect of the present disclosure is directed to a computing system for estimation of an object state from image data. The computing system can include one or more processors. The computing system can include one or more tangible, non-transitory computer readable media storing computer-readable instructions that when executed by the one or more processors cause the one or more processors to perform operations. The operations can include processing, with an estimation portion of a machine-learned object state estimation model, two-dimensional image data depicting an object to obtain an initial estimated state of the object. The operations can include, for each of one or more refinement iterations, obtaining a previous loss value associated with a previous estimated state for the object. The operations can include, for each of one or more refinement iterations, processing, with a refinement portion of the machine-learned object state estimation model, the previous loss value to obtain a current estimated state of the object. The operations can include, for each of one or more refinement iterations, evaluating a loss function to determine a loss value associated with the current estimated state of the object. The operations can include, for each of one or more refinement iterations, determining, based at least in part on a final refinement iteration of the one or more refinement iterations, a final estimated state for the object. The operations can include, for each of one or more refinement iterations, adjusting, based at least in part on a loss function, one or more parameters of the machine-learned object state estimation model, wherein the loss function is configured to evaluate a difference between the final estimated state for the object and ground truth data associated with the two-dimensional image data.

Another example aspect of the present disclosure is directed to one or more tangible, non-transitory computer readable media storing computer-readable instructions that when executed by one or more processors cause the one or more processors to perform operations. The operations can include obtaining two-dimensional image data depicting an object. The operations can include processing, with an estimation portion of a machine-learned object state estimation model, the two-dimensional image data to obtain an initial estimated state of the object. The operations can include, for each of one or more refinement iterations, obtaining a previous loss value associated with a previous estimated state for the object. The operations can include, for each of one or more refinement iterations, processing, with a refinement portion of the machine-learned object state estimation model, the previous loss value to obtain a current estimated state of the object. The operations can include, for each of one or more refinement iterations, evaluating a loss function to determine a loss value associated with the current estimated state of the object. The operations can include providing, based at least in part on a final refinement iteration of the one or more refinement iterations, a final estimated state for the object.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1A depicts a block diagram of an example computing system that performs refined state estimation of an object according to example embodiments of the present disclosure.

Figure 1B:
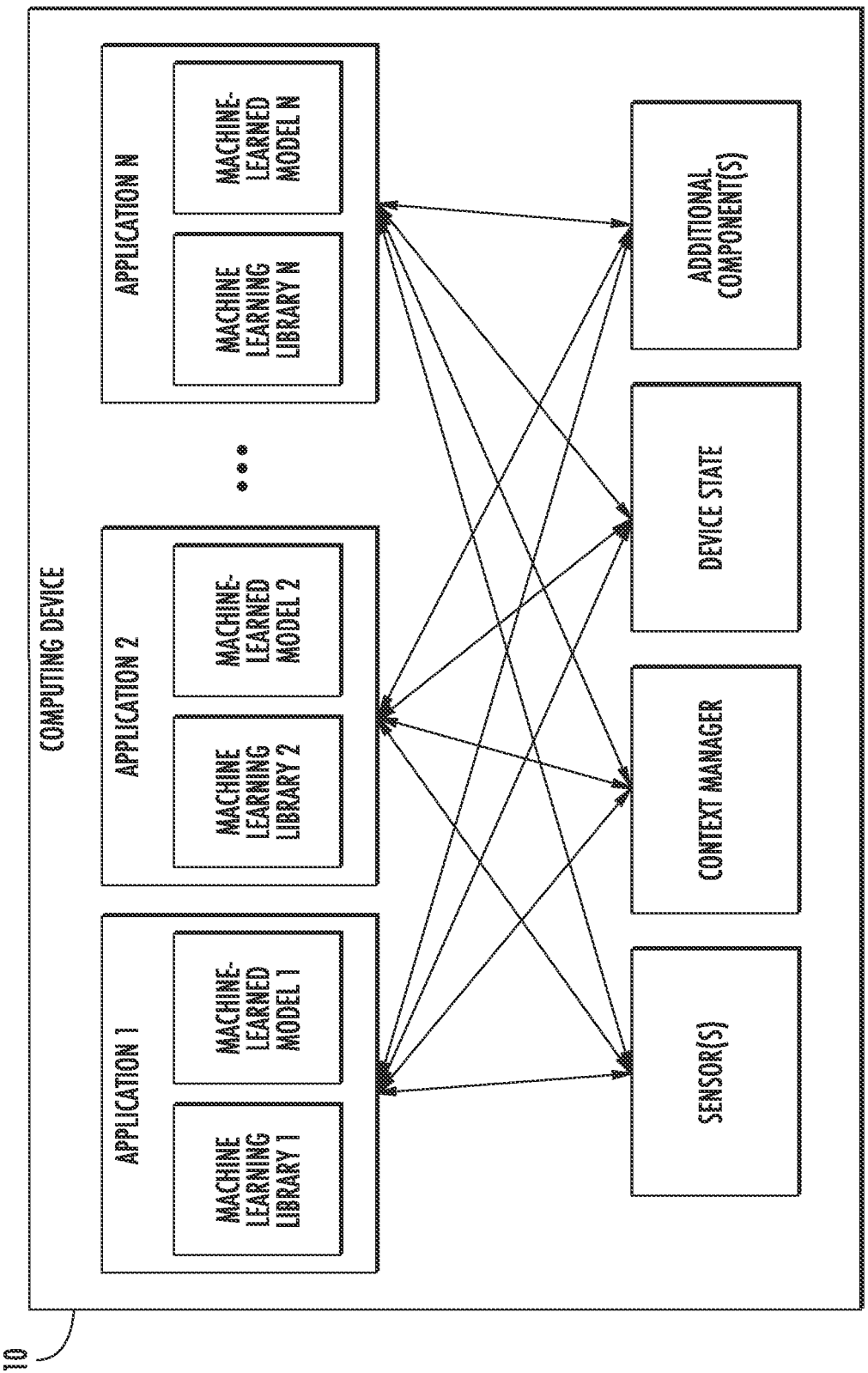
FIG. 1B depicts a block diagram of an example computing device that performs refined state estimation for an object according to example embodiments of the present disclosure.

Reference numerals that are repeated across plural figures are intended to identify the same features in various implementations.

DETAILED DESCRIPTION

Overview

Generally, the present disclosure is directed to refined object state estimation. More particularly, the present disclosure relates to end-to-end training and utilization of machine-learned model(s) for estimation of three-dimensional object representations from two-dimensional image data. As an example, two-dimensional image data can be obtained that depicts an object (e.g., a human body, an animal body, a product, etc.) that includes one or more segments (e.g., hand(s), arm(s), a torso, leg(s), a head, a face, article(s) of clothing, feet, etc.). The two-dimensional image data can be processed using a machine-learned object state estimation model to obtain a final estimated state for the object. More particularly, an estimation portion of the model can first be used to generate an initial estimated state of the object. A refinement portion of the model can include one or more refinement submodels (e.g., recurrent neural network(s), etc.). Each of the refinement submodel(s) can refine the initial estimated state over a number of refinement iterations by determining a loss at each iteration. In some implementations, the loss at each iteration can be determined in a self-supervised or semi-supervised fashion, therefore avoiding the prohibitive difficulties associated with both acquisition of three-dimensional training data and performance of gradient descent during model testing.

Additionally, in some implementations, the refinement portion of the model can include a number of segment refinement portions that are associated with a respective number of segments of the object depicted in the image data. For example, the object may be a human body that includes a plurality of segments (e.g., a head, hands, feet, legs, a torso, etc.). A respective plurality of segment refinement portions of the machine-learned object state estimation model can be used to process each of the segments over a number of refinement iterations. A final estimated state of the object can be determined from each of the refined state estimations for the segments (e.g., by fusing each of the refined state estimations, etc.). In such fashion, the machine-learned object state estimation model can be trained and utilized to generate a refined, accurate estimation of the object without requiring full supervision and annotation of three-dimensional training data.

More particularly, two-dimensional image data (e.g., one or more two-dimensional images, a monocular two-dimensional RGB image, two-dimensional video data, two-dimensional sensor data, two-dimensional LIDAR data, etc.) can be obtained. The two-dimensional image data can include or otherwise depict an object. In some implementations, the object can include one or more object segments. An object segment can be or otherwise include any specific portion of the object. As an example, the object can be a human body. The body segments for the body can include any specific portion of the body (e.g., feet, hand(s), arm(s), head, leg(s), torso, etc.). As another example, the one or more body segments may include a torso segment, a head segment, two leg segments, two arm segments, and a full-body segment. As yet another example, the one or more body segments may include the entire body as one segment. It should be noted that the object included or otherwise depicted by the two-dimensional image data may not include every segment of the object. As an example, the image data may only depict one half of the particular object (e.g., the upper half of a human body, a specific segment of a furniture object, etc.).

In some implementations, the two-dimensional image data can depict the object based at least in part on one or more camera parameter(s). As an example, the two-dimensional image data can depict the object based on a perspective that corresponds to a pinhole camera with intrinsics $C=[f_x, f_y, c_x, c_y]^T$ and associated perspective projection operator $x_{2d}=\Pi(x_{3d}, C)$, where $x_{3d}$ is any three-dimensional point. As another example, during training and/or testing of the model, intrinsics for the full input image can be approximated such that $f_x=\max(H, W)$, $f_y=\max(H, W)$, $c_x=W/2$, $c_y=H/2$, where H, W are the input dimensions.

In some implementations, the two-dimensional image data can include one or more bounding boxes that correspond to the depicted object and/or the one or more segments of the depicted object. In some implementations, the two-dimensional image data can be or can otherwise be resized to a certain size. As an example, the two-dimensional image data can be or can be resized to a fixed size of 480×480. The intrinsics C of the two-dimensional image data can then be warped into corresponding crop intrinsics $C_c$ such that:

$$[C_c^T 1]^T = K[C^T 1]^T$$

where $K \in \mathbb{R}^{5 \times 5}$ can represent the scale and translation matrix, adapting the image intrinsics C. By using cropped intrinsics, the state of the 3D model can be solved for (e.g., including global scene translation, etc.) in the camera space of the two-dimensional image data.

In some implementations, for multiple detections in the same two-dimensional image data, processing the two-dimensional image data with the machine-learned object state estimation model can generate a three-dimensional representation (e.g., a 3D mesh, etc.) that is estimated relative to a common world coordinate system into the same three-dimensional scene. As an example, at test time when switching $C_c$ with C, the three-dimensional object state estimation (e.g., a model projection, etc.) can also align with the corresponding object layout in the two-dimensional image data.

Additionally, or alternatively, in some implementations, the one or more segments of the object can include item(s) of clothing for a body. For example, the object can be a human body, and the one or more segments of the body may include a right leg segment, a left leg segment, and a clothing segment associated with the right and left leg segments (e.g., pants, shorts, leggings, a dress, a skirt, etc.). As another example, the one or more segments may include a feet segment and an associated clothing segment (e.g., shoes, sandals, etc.). As such, it should be broadly understood that the one or more segments can include any articles of clothing and/or ornamentation (e.g., jewelry, a watch, a hat, etc.) that can be associated with a body object.

An estimation portion (e.g., one or more convolutional network(s), etc.) of the machine-learned object state estimation model can be used to process the two-dimensional image data to obtain an initial estimated state of the object. As an example, the estimation portion of the machine-learned object state estimation model can process the two-dimensional image data to obtain an initial estimated state of the object $s=[\theta^T, \beta^T, r^T, t^T]^T$. In some implementations, the estimation portion of the machine-learned object state estimation model (e.g., one or more convolutional neural networks, a multi-stage subnetwork, etc.) can process the two-dimensional image data to obtain features $F \in \mathbb{R}^{60 \times 60 \times 256}$, keypoint detection heatmaps $K \in \mathbb{R}^{60 \times 60 \times 137}$, and body segment segmentation maps $B \in \mathbb{R}^{60 \times 60 \times 15}$. These features, keypoint detection heatmaps, and/or body segment segmentation maps can be embedded into a low-dimensional space using the estimation portion of the model to obtain context data. For example, the estimation portion of the model can process the two-dimensional image data to obtain context data represented as a code vector $s^c$, where c represents the optimization's objective function context. Additionally, in some implementations, the camera intrinsics can be included in the context data. Additionally, or alternatively, in some implementations, the estimation portion may resize the two-dimensional image data before processing the image data (e.g., resizing the image from a first size to 480×480 pixels, etc.).

For each one or more refinement iterations, a previous loss value associated with a previous estimated state for the object can be obtained. The previous loss value can be processed with a refinement portion of the machine-learned object state estimation model (e.g., one or more recurrent neural networks, etc.) to obtain a current estimated state of the object. A loss function can then be evaluated to determine a loss value associated with the current estimated state of the object. As an example, for a first refinement iteration, the previous loss value can be associated with the initial estimated state generated with the estimation portion of the machine-learned object state estimation model. The refinement portion can process the previous loss value to obtain a current estimated state of the object for the first refinement iteration, and the loss function can be evaluated to determine a loss value associated with the current estimated state. Then, for a second refinement iteration, the loss value determined in the first iteration (e.g., the previous loss value associated with the previous estimated state, etc.) can be obtained and processed with the refinement portion to generate the current estimated state for the second refinement iteration.

As a more particular example, to utilize the refinement portion of the machine-learned object state estimation model, the refinement portion can include one or more recurrent neural network(s) a Recurrent Neural Network module $RNN_\delta(s^c, s_i, m_i)$, where $m_i$ can represent the internal memory data (e.g., a hidden memory state) of the network at a refinement iteration i, and can unroll the updates into M stages:

$$\begin{bmatrix} s_i \\ m_i \end{bmatrix} = RNN_\delta(s_{i-1}, m_{i-1}, L_u^{i-1}, s^c)$$

The loss at each iteration i can be determined in a variety of ways. As an example, if two-dimensional and/or three-dimensional ground truth data associated with the two-dimensional image is available, the ground truth data can be utilized to determine the loss at each refinement iteration. Alternatively, if annotated training data is not available, each refinement stage can employ self-supervision in the training stage of the machine-learned object state estimation model.

As an example, the loss determined by evaluating the loss function at each refinement iteration i can be represented as:

$$L_u^i(s, K, B) = \lambda_k L_k(s_i, K) + \lambda_b L_b(s_i, B) + l(\theta_i, \beta_i),$$

Where $l = -\log(p)$, $L_k$ can represent a 2D keypoint alignment loss, $L_b$ can represent a 2D semantic body part alignment (e.g., defined in terms of differentiable rendering, etc.), and M can represent the total number of training LSTM stages, while $\lambda_k$ and $\lambda_b$ can represent cross-validated scalar values which balance the loss terms.

In some implementations, the current estimated state of the object can be or otherwise include a three-dimensional representation of the object, and the keypoint alignment loss, $L_k$, can measure the reprojection error of the 3D portions of the current estimated state of the object with regards to the predicted 2D keypoints. This loss can, in some implementations, be defined as the 2D mean-per-segment position error (MPSPE). As an example, the object can be a human body that includes a plurality of joint segments (e.g., elbows, knees, etc.). The keypoint alignment loss $L_k$ can measure the reprojection error of the 3D joint segments and predicted 2D joint keypoints. This keypoint alignment loss can be represented as:

$$L_k(s_t, K) = \frac{1}{N_j} \sum_i^{N_j} \|j_i(K) - \Pi(J_i(s_t), C_c)\|_2.$$

with $N_j$ keypoints. Additionally, $j_i(K)$ can represent the 2D location of the i-th 2D keypoint extracted from the K heatmap, and $J_i(s_t)$ can represent the i-th 3D keypoint computed by posing the object model (e.g., the final estimated state of the object, etc.) at $s_t$.

In some implementations, the loss can include an object alignment loss $L_b$. As an example, the object alignment loss can utilize a current prediction $s_t$ to create an object-segment semantic segmentation image $I(M(s_t), C_c) \in \mathbb{R}^{H \times W \times 15}$. To follow the previous example, a soft differentiable rasterization process can be followed to fuse probabilistic contributions of all predicted mesh triangles of the final estimated state for the object with respect to the rendered pixels. In such fashion, gradients can flow to the occluded and far-range vertices.

In some implementations, to be able to aggregate occlusion states and semantic information, each mesh vertex of the final estimated state of the object can be appended to its semantic label as a one-hot vector $\{0,1\}^{15\times1}$, and a constant alpha value of 1. The target object segment semantic probability maps B can also be appended with a visibility value equal to the foreground probability $\in [0,1]^{H\times W\times1}$. The loss can represent the mean-per-pixel absolute value of the difference between the estimated and predicted semantic segmentation maps of the object as represented by:

$$L_b(s_t, B) = \frac{1}{HW}\sum_i^{HW} \|B_i - I(M(s_t), C_c)_i\|_1.$$

In some implementations, for object shape and pose, two regularizers can be included. As an example, the regularizers can be proportional to the negative log-likelihood of their associated Gaussian distributions as represented by:

$$l(\theta) = -\log p(\theta) = \|\theta\|_2^2, l(\beta) = -\log p(\beta) = \|\beta\|_2^2.$$

In some implementations, three-dimensional, fully supervised training data can be available for determination of the loss. As an example, the following unit training loss $L_f^i$ can be utilized.

Additionally, or alternatively, additional unit training losses described previously can be utilized alongside the unit training loss as represented by:

$$L_f^i(s) = \lambda_m L_m(M(s_i), \tilde{M}) + \lambda_{3d} L_{3d}(J(s_i), \tilde{J})$$

Where $L_m$ can represent a 3D vertex error between the ground-truth mesh $\tilde{M}$ and a predicted object state estimate. $M(s_i)$—can be obtained by posing the object state estimation using the predicted state $s_i$. $L_{3d}$ can represent the 3D MPSPE between the 3D joints recovered from predicted object state parameters $J(s_i)$. Ground-truth 3D joints (e.g., $\tilde{J}$, $\lambda_m$, $\lambda_{3d}$, etc.) can represent the scalar values that balance the two terms.

Following the one or more refinement iterations, a final estimated state for the object can be provided based at least in part on a final refinement iteration of the one or more refinement iterations. As an example, the final estimated state for the object may be provided by the machine-learned object state estimation model at a final refinement iteration of the one or more refinement iterations. In some implementations, the final estimated state of the object may be or otherwise include three-dimensional pose data. Additionally, or alternatively, in some implementations the final estimated state of the object may be or otherwise include three-dimensional mesh comprising one or more pose variables and one or more state variables.

As an example, the object can be a body. The final estimated state for the object can include pose state variables $\theta \in \mathbb{R}^{N_p\times1}$ and shape state variables $\beta \in \mathbb{R}^{N_s\times1}$, where $N_p$ can represent the number of posing variables and $N_s$ can represent the length of the shape code. To follow the previous example, the final estimated state for the object can be or otherwise include a posed mesh $M(\theta, \beta)$ which can include $N_v$ associated 3D vertices $V=\{v_i, i=1 \ldots N_v\}$ with fixed topology. The rigid transformation of the model in camera space can be represented by a 6D rotation $r \in \mathbb{R}^{6\times1}$ and a translation vector $t \in \mathbb{R}^{3\times1}$. As such, the final estimated state for the object (e.g., a posed mesh representation, etc.) can be represented as $M(\theta, \beta, r, t)$.

Systems and methods of the present disclosure provide a number of technical effects and benefits. As one example technical effect and benefit, the training and utilization of machine-learned models for object state estimation conventionally requires the use of non-linear optimization alongside fully supervised training with annotated three-dimensional training data. However, fully supervised non-linear optimization can require the expenditure of a prohibitively expensive quantity of computational resources (e.g., memory, processing cycles, power usage, etc.). However, by incorporating multiple refinement stages in a "learning-to-learn" architecture that facilitates self-supervision, systems and methods of the present disclosure obviate the need for fully supervised training and gradient descent optimization techniques in testing, therefore significantly reducing the expenses and computational costs (e.g., memory, processing cycles, power usage, etc.) associated with training and utilization of models for object state estimation.

With reference now to the Figures, example embodiments of the present disclosure will be discussed in further detail.

Example Devices and Systems

FIG. 1A depicts a block diagram of an example computing system 100 that performs refined state estimation of an object according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned object state estimation models 120. For example, the machine-learned object state estimation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned object state estimation models 120 are discussed with reference to FIGS. 2-5.

In some implementations, the one or more machine-learned object state estimation models 120 can be received from the server computing system 130 over network 180, stored in the user computing device memory 114, and then used or otherwise implemented by the one or more processors 112. In some implementations, the user computing device 102 can implement multiple parallel instances of a single machine-learned object state estimation model 120 (e.g., to perform parallel object state estimation across multiple instances of the machine-learned object state estimation model).

More particularly, the machine-learned object state estimation model 120 can be trained end-to-end and utilized for estimation of three-dimensional object representations from two-dimensional image data. As an example, two-dimensional image data can be obtained that depicts an object (e.g., a human body, an animal body, a product, etc.) that includes one or more segments (e.g., hand(s), arm(s), a torso, leg(s), a head, a face, article(s) of clothing, feet, etc.). The two-dimensional image data can be processed using the machine-learned object state estimation model 120 to obtain a final estimated state for the object. More particularly, an estimation portion of the model 120 can first be used to generate an initial estimated state of the object. A refinement portion of the model 120 can then refine the initial estimated state over a number of refinement iterations by determining a loss at each iteration. Rather than employ costly and inefficient training supervision, the loss can be calculated between a current estimated state and a previous estimated state.

Additionally, in some implementations, the refinement portion of the model 120 can include a number of refinement submodels (e.g., recurrent neural network(s), etc.) that correspond to a respective number of segments of the object depicted in the image data. For example, the object may be a human body that includes a plurality of segments (e.g., a head, hands, feet, legs, a torso, etc.). A respective plurality of refinement submodels of the refinement portion of the model 120 can be used to generate refinements for each of the respective segments of a number of refinement iterations. A final estimated state of the object can be generated determined from each of the refined state estimations for the segments (e.g., by fusing all of the refined state estimations, etc.). In such fashion, the machine-learned object state estimation model 120 can be trained and utilized to generate a refined, accurate estimation of the object without requiring full supervision and annotation of three-dimensional training data.

Additionally, or alternatively, one or more machine-learned object state estimation models 140 can be included in or otherwise stored and implemented by the server computing system 130 that communicates with the user computing device 102 according to a client-server relationship. For example, the machine-learned object state estimation models 140 can be implemented by the server computing system 140 as a portion of a web service (e.g., an object state estimation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned object state estimation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned object state estimation models 120 and/or 140 based on a set of training data 162. The training data 162 can include, for example, two-dimensional image data depicting object(s) and associated ground truth data. The associated ground truth data can, for example, include two-dimensional and/or three-dimensional annotation data for the object.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs refined state estimation for an object according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
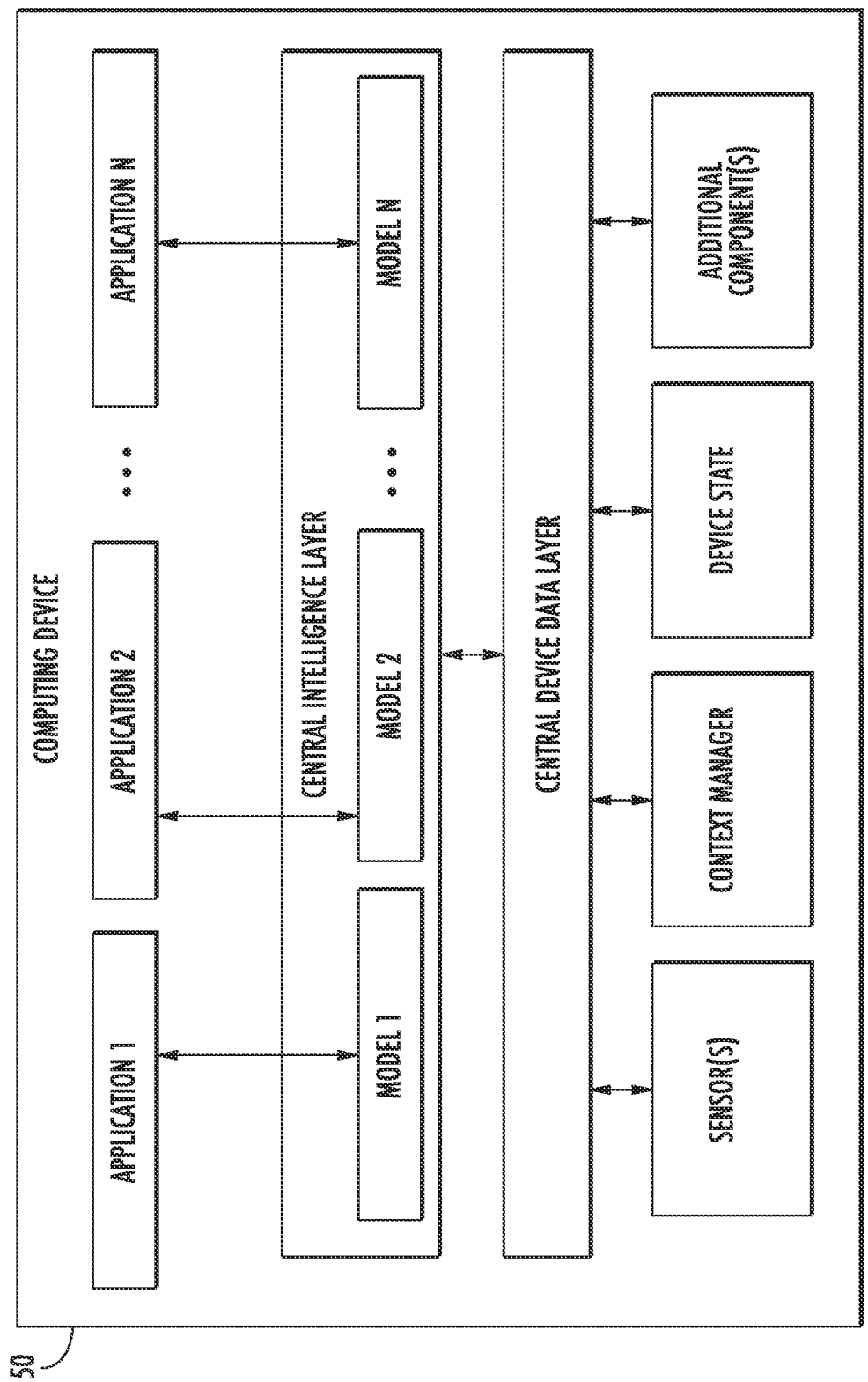
FIG. 1C depicts a block diagram of an example computing device that performs training of a machine-learned object state estimation model according to example embodiments of the present disclosure.

FIG. 1C depicts a block diagram of an example computing device 50 that performs training of a machine-learned object state estimation model according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
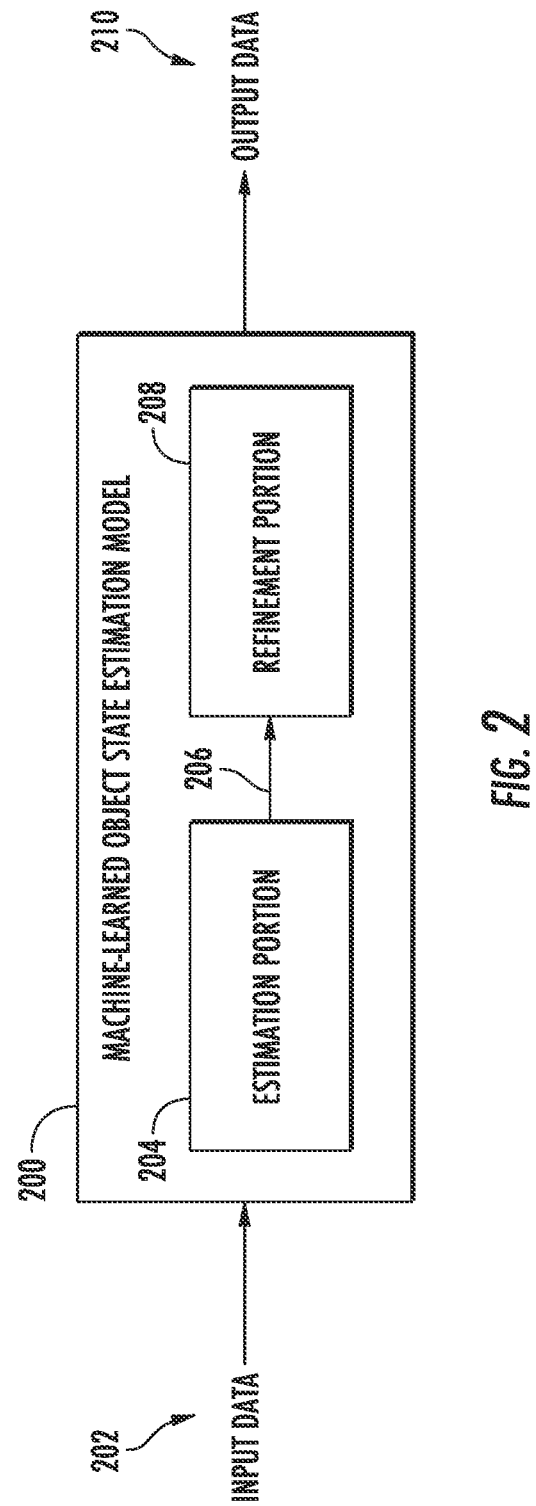
FIG. 2 depicts a block diagram of an example machine-learned object state estimation model according to example embodiments of the present disclosure.

FIG. 2 depicts a block diagram of an example machine-learned object state estimation model 200 according to example embodiments of the present disclosure. In some implementations, the machine-learned object state estimation model 200 is trained to receive a set of input data 202 descriptive of two-dimensional image data that depicts an object, and, as a result of receipt of the input data 202, provide output data 210 that includes a final estimated state for the object depicted in the input data 202. Thus, in some implementations, the machine-learned object state estimation model 200 can include an estimation portion 204 that is operable to provide an initial estimated state 206 of the object depicted in the image data 202, and a refinement portion 208 that is operable to refine the initial estimated state 206 over a number of refinement iterations to generate the output data 210.

More particularly, input data 202 (e.g., two-dimensional image data, etc.) can be obtained that depicts an object (e.g., a human body, an animal body, a product, etc.). The object can include one or more segments (e.g., hand(s), arm(s), a torso, leg(s), a head, a face, article(s) of clothing, feet, etc.). The two-dimensional image data 202 can be processed using the machine-learned object state estimation model 200 to obtain a final estimated state 210 for the object. More particularly, an estimation portion 204 of the model 200 can first be used to generate an initial estimated state 206 of the object. The refinement portion 208 of the model 200 can then refine the initial estimated state 206 over a number of refinement iterations by determining a loss at each iteration.

Figure 3:
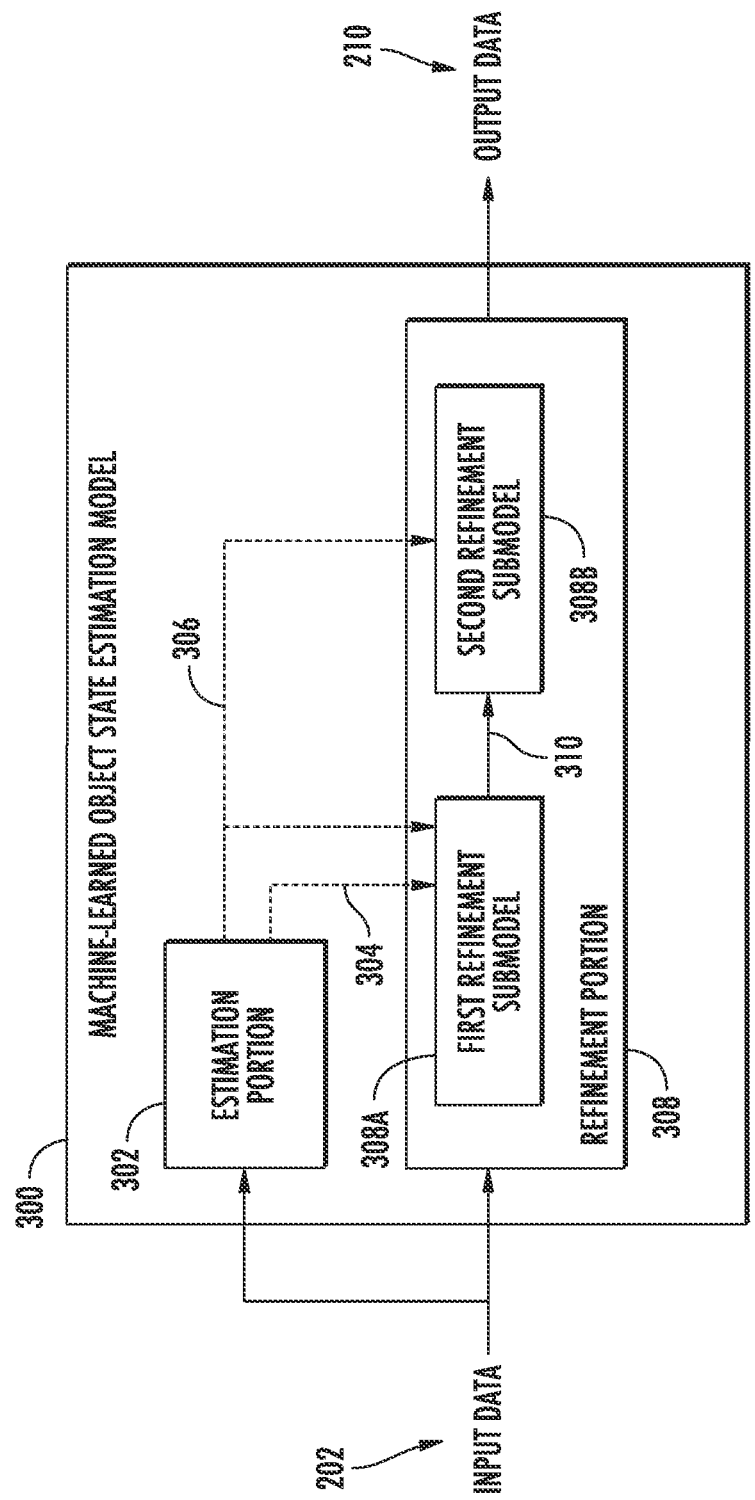
FIG. 3 depicts a block diagram of an example machine-learned object state estimation model according to example embodiments of the present disclosure.

FIG. 3 depicts a block diagram of an example machine-learned object state estimation model 300 according to example embodiments of the present disclosure. The machine-learned object state estimation model 300 is similar to the machine-learned object state estimation model 200 of FIG. 2 except that the machine-learned object state estimation model 300 further includes a plurality of refinement submodels respectively associated with a plurality of object segments of the object depicted in the image data 202.

More particularly, the machine-learned object state estimation model 300 can be configured to process input data 202. As described with regards to FIG. 2, the input data 202 can be or otherwise include image data that depicts an object. As an example, the object depicted in input data 202 can be a body. In some implementations, the body depicted by the input data 202 can include a plurality of body segments (e.g., arms, head, feet, face, legs, torso, etc.). The estimation portion 302 of the machine-learned object state estimation model 300 can process the input data 202 to obtain an initial estimated state of the object 304 and context data 306. The context data 306 (e.g., feature maps, camera intrinsics, etc.) extracted from the input data 202.

The initial estimated state of the object 304 can be provided to the first refinement submodel 308A of the refinement portion 308. More particularly, loss data can be provided to the first refinement submodel 308A based on a loss function that evaluates a difference between the initial estimated state of the object 304 and the input data 202. The first refinement submodel 308A can process the context data 306 and the loss data to generate a current estimated state of the object 310. Loss data can be determined by evaluating a loss function that evaluates the current estimated state of the object 310, and can be provided to the second refinement submodel 308B of the refinement portion 308.

The second refinement submodel 308B can process the context data 306 and the loss data determined from the estimate 310 to produce a final estimated state 210 of the object. The final estimated state 210 of the object can, in some implementations, be or otherwise include a three-dimensional representation (e.g., a mesh, etc.) of the object depicted by the input data 202. In such fashion, the machine-learned object state estimation model 300 can generate an initial state estimate 304 for the object using the estimation portion 302, and can then refine the estimate over a number of refinement iterations using the first and second refinement submodels 308A/308B of the refinement portion 308.

Figure 4:
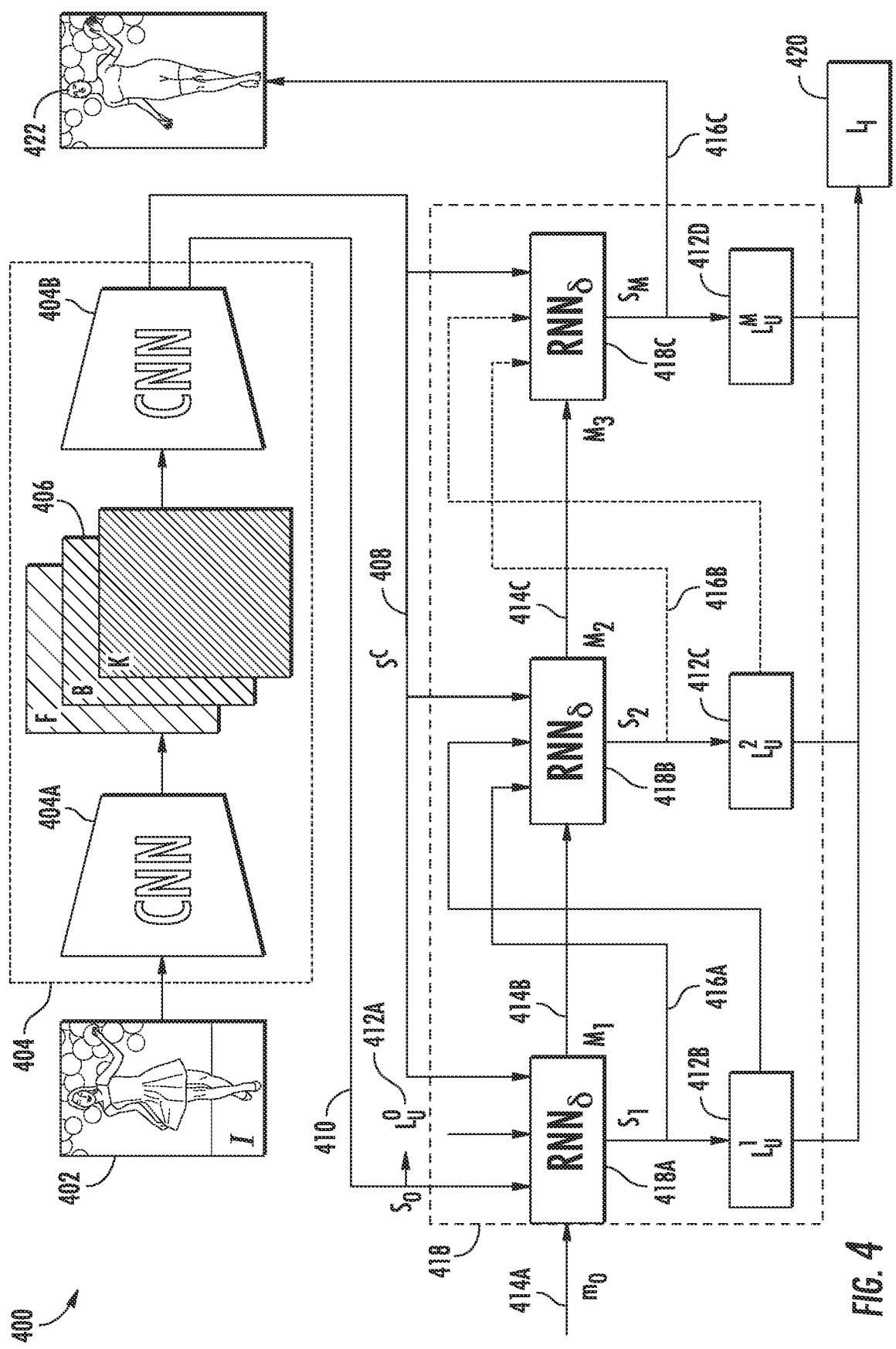
FIG. 4 depicts a data flow diagram for generating a final object state estimation with an example machine-learned object state estimation model according to example embodiments of the present disclosure.

FIG. 4 depicts a data flow diagram 400 for generating a final object state estimation with an example machine-learned object state estimation model according to example embodiments of the present disclosure. More particularly, two-dimensional image data 402 (e.g., one or more two-dimensional images, a monocular two-dimensional RGB image, two-dimensional video data, two-dimensional sensor data, two-dimensional LIDAR data, etc.) can be obtained. The two-dimensional image data 402 can include or otherwise depict an object. To follow the depicted example, the two-dimensional image data 402 can depict a woman in a dress.

The two-dimensional image data 402 can be processed using an estimation portion 404 of a machine-learned object state estimation model to obtain an initial estimated state of the object 410. As an example, the estimation portion 404 of the machine-learned object state estimation model can process the two-dimensional image data 402 to obtain the initial estimated state of the object 410 $s=[\theta^T, \beta^T, r^T, t^T]^T$. In some implementations, the estimation portion 404 of the machine-learned object state estimation model include a first network 404A and a second network 404B (e.g., first and second convolutional neural networks, etc.). The first network 404A can process the two-dimensional image data 402 to obtain FBK data 406. FBK data 406 can include features $F \in \mathbb{R}^{60 \times 60 \times 256}$, keypoint detection heatmaps $K \in \mathbb{R}^{60 \times 60 \times 137}$, and body segment segmentation maps $B \in \mathbb{R}^{60 \times 60 \times 15}$. The FBK data 406 (e.g., the features, keypoint detection heatmaps, and/or body segment segmentation maps, etc.) can be processed by the second network 404B of the estimation portion 404 to obtain context data 408. Context data 408 can be or otherwise include a low-dimensional space embedding of the FBK data 406. For example, the second network 404B of the estimation portion 404 of the model can process the two-dimensional image data 402 to obtain the context data 408 represented as a code vector $s^c$, where c represents the optimization's objective function context. Additionally, in some implementations, camera intrinsics data can be included in the context data 408. Additionally, or alternatively, in some implementations, one of the networks of the estimation portion 404 (e.g., first network 404A, etc.) may resize the two-dimensional image data 402 before processing the image data 402 (e.g., resizing the image data 402 from a first size to 480×480 pixels, etc.).

For a first refinement iteration, the context data 408 and the initial estimated state of the object 410 can be provided to a refinement portion 418 of the machine-learned object state estimation model. More particularly, the refinement portion 418 can include a plurality of refinement submodels 418A-418C, each configured to generate a current estimated state of the object (e.g., 416A-416C, etc.). As such, the refinement portion 418 of the model can refine the initial estimated state of the object 410 over a number of refinement iterations.

As an example, each of the refinement portions 418A-418C can be or otherwise include a recurrent neural network. The initial estimated state of the object 410 can be evaluated using a loss function to obtain a first loss value 412A. The first loss value 412A, alongside the initial estimated state of the object 410, first internal memory data 414A (e.g., an internal memory state of a respective recurrent neural network 418A-418C, etc.), and context data 408 can be provided to the first refinement portion 418A. The first refinement portion 418A can process the internal memory data 414A, the initial estimated state of the object 410, the first loss value 412A, and the context data 408 to obtain a first current estimated state of the object 416A.

The first current estimated state of the object 416A can be evaluated using the loss function to determine a second loss value 412B. As an example, the loss function (e.g., a loss term of the loss function, etc.) can be configured to evaluate a difference between the current estimated state of the object 416A and ground truth data (e.g., two-dimensional annotation data, three-dimensional annotation data, data derived from the initial estimated state of the object 410, etc.) to determine the second loss value 412B. The second loss value 412B, the first current estimated state of the object 416A, internal memory data 414B (e.g., hidden memory state data from the submodel 418A after processing, etc.), and context data 408 can be provided to second refinement submodel 418B.

For a second refinement iteration, the second refinement submodel 418B can process the internal memory data 414B, the previously estimated state of the object 416A (e.g., the first current estimated state of the object, etc.), the second loss value 412B, and the context data 408 to obtain a second current estimated state of the object 416B. The second current estimated state of the object 416B can be evaluated using the loss function to determine a third loss value 412C. As an example, the loss function (e.g., a loss term of the loss function, etc.) can be configured to evaluate a difference between the second current estimated state of the object 416B and ground truth data (e.g., two-dimensional annotation data, three-dimensional annotation data, data derived from the initial estimated state of the object 410, etc.) to determine the third loss value 412C. The third loss value 412C, the second current estimated state of the object 416B, the internal memory data 414B (e.g., hidden memory state data from the submodel 418A after processing, etc.), and the context data 408 can be provided to third refinement submodel 418C.

For a third refinement iteration, the third refinement submodel 418C can process the internal memory data 414C, the previously estimated state of the object 416B (e.g., the second current estimated state of the object, etc.), the third loss value 412C, and the context data 408 to obtain a third current estimated state of the object 416C. The third current estimated state of the object 416C can be evaluated using the loss function to determine a third loss value 412C. As an example, the loss function (e.g., a loss term of the loss function, etc.) can be configured to evaluate a difference between the third current estimated state of the object 416C and ground truth data (e.g., two-dimensional annotation data, three-dimensional annotation data, data derived from the initial estimated state of the object 410, etc.) to determine the fourth loss value 412D.

Based on the third current estimated state of the object 416C, a final estimated state of the object 422 can be determined. In some implementations, the final estimated state of the object 422 can be the third current estimated state of the object 416C. Alternatively, in some implementations, the third current estimated state of the object 416C can be processed to determine the final estimated state of the object 422. As an example, the object depicted by the image data 402 can be a segment of an object. The third current estimated state of the object 416C can be a final estimated state of the segment of the object, and can be fused with final estimated states for other segments of the object to determine the final estimated state of the object 422.

In some implementations, a final loss value 420 can be determined based at least in part on each of the loss values 412A-412D. More particularly, the loss values 412A-412D can be aggregated to determine a final loss value 420. Based on the final loss value 420, one or more parameter(s) of the estimation portion and/or the refinement portion of the machine-learned object state estimation model can be adjusted.

It should be noted that the number of refinement submodels 418A-418C included in the depiction of the refinement portion 418, and the number of networks 404A-404B included in the depiction of the estimation portion 404, have each been selected merely to more easily illustrate the systems and methods of the present disclosure. As such, it should be broadly understood that any type and/or number of refinement submodel(s) and/or estimation network(s) can be included respectively in the refinement portion 418 and the estimation portion 404 of the present disclosure.

Figure 5:
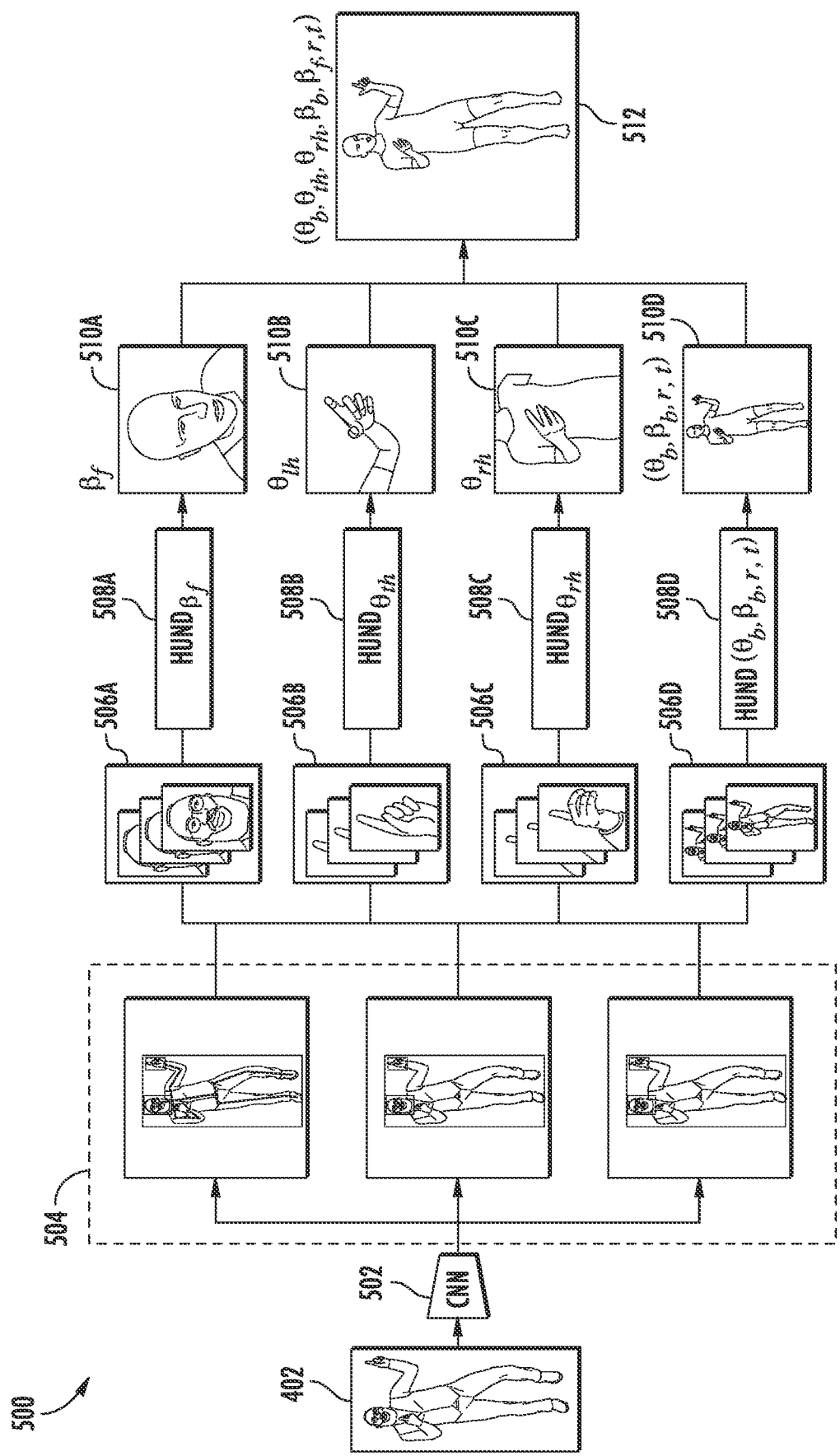
FIG. 5 depicts a data flow diagram for generating a final object state estimation with an example machine-learned object state estimation model comprising a plurality of segment refinement portions according to example embodiments of the present disclosure.

FIG. 5 depicts a data flow diagram 500 for generating a final object state estimation with an example machine-learned object state estimation model comprising a plurality of segment refinement portions according to example embodiments of the present disclosure. More particularly, two-dimensional image data 402 can be obtained (e.g., by a computing system, etc.) that depicts an object. The two-dimensional image data 402 can be the same image data as described with regards to the two-dimensional image data of FIG. 4. As an example, the object depicted in the two-dimensional image data 402 can be a human body that includes a plurality of body segments. The body segments for the body can include any specific portion of the body (e.g., feet, hand(s), arm(s), head, leg(s), torso, etc.). To follow the depicted example, the body segments may include a head segment 506A, a left hand segment 506B, a right hand segment 508C, and a body segment 508D. It should be noted that the object included or otherwise depicted by the two-dimensional image data 402 may not include every segment of the object. As an example, the image data may only depict one half of the particular object (e.g., the upper half of a human body, a specific segment of a furniture object, etc.).

In some implementations, the two-dimensional image data 402 can depict the object based at least in part on one or more camera parameter(s). As an example, the two-dimensional image data 402 can depict the object based on a perspective that corresponds to a pinhole camera with intrinsics $C=[f_x, f_y, c_x, c_y]^T$ and associated perspective projection operator $x_{2d}=\Pi(x_{3d}, C)$, where $x_{3d}$ is any three-dimensional point. As another example, during training and/or testing of the model, intrinsics for the full input image 402 can be approximated such that $f_x$=max(H, W), $f_y$=max (H, W), $c_x$=W/2, $c_y$=H/2, where H, W are the input dimensions.

In some implementations, the two-dimensional image data 402 can include one or more bounding boxes that correspond to the depicted object and/or the one or more segments of the depicted object. In some implementations, the two-dimensional image data 402 can be or can otherwise be resized to a certain size. As an example, the two-dimensional image data 402 can be or can be resized to a fixed size of 480×480. The intrinsics C of the two-dimensional image data 402 can then be warped into corresponding crop intrinsics $C_c$ such that:

$$[C_c^T 1]^T = K[C^T 1]^T$$

$K \in \mathbb{R}^{5 \times 5}$ can represent the scale and translation matrix, adapting the image intrinsics C. By using cropped intrinsics, the state of the 3D model can be solved for (e.g., including global scene translation, etc.) in the camera space of the two-dimensional image data.

Additionally, or alternatively, in some implementations, the one or more segments of the object can include item(s) of clothing for a body. For example, the object can be a human body, and the one or more segments of the body may include a right leg segment, a left leg segment, and a clothing segment associated with the right and left leg segments (e.g., pants, shorts, leggings, a dress, a skirt, etc.). As another example, the one or more segments may include a feet segment and an associated clothing segment (e.g., shoes, sandals, etc.). As such, it should be broadly understood that the one or more segments can include any articles of clothing and/or ornamentation (e.g., jewelry, a watch, a hat, etc.) that can be associated with a body object.

The two-dimensional image data 402 can be processed with an estimation portion 502. In some implementations, the estimation portion can be the same as described with respect to estimation portion 404 of FIG. 4. The estimation portion 502 can process the two-dimensional image data 402 to obtain intermediate data. In some implementations, the intermediate data can include segmentation data that segments the body depicted in the two-dimensional image data 402 into a plurality of segments 506A-506D. For example, the estimation portion 504 can process the image data 402 to obtain head segment data 506A, left hand segment data 506B, right hand segment data 506C, and body segment data 506D. Additionally, or alternatively, in some implementations the estimation portion 502 can process the image data 402 to obtain context data. The context data can be the same data as described with respect to context data portion 408 of FIG. 4. In some implementations, the estimation portion 502 can generate context data for each of the body segments 506A-506D. For example, the estimation portion 502 can produce head context data, right hand context data, left hand context data, and body context data. Alternatively, or additionally, in some implementations, the estimation portion can process the image data 402 to obtain context data indicative of a context of the entire object.

Segment refinement portions 508A-508D can respectively process each of the image segments 506A-506D. In some implementations, each of the segment refinement portions 508A-508D can be a refinement portion as described with respect to refinement portion 418 of FIG. 4. For example, the segment refinement portion 508A can be a refinement portion with a plurality of refinement submodels (e.g., a plurality of recurrent neural networks, etc.). The refinement portion 508A can be trained specifically to process a specific object segment (e.g., head segment 506A) to generate a final estimated state of the object segment. As a more particular example, the estimation portion 502 can process the image data 402 to segment the image data into a plurality of segments (e.g., 506A-506D), generate context data and an initial estimated object state for each segment 506A-506D, and can provide segment refinement portion 508A with context data, the two-dimensional image data, and an initial estimated state for the object segment 506A.

Alternatively, in some implementations, each of the segment refinement portions 508A-508D can be a machine-learned object state estimation model as described with respect to the machine-learned object state estimation model 300 of FIG. 3. For example, the left hand segment refinement portion 508B can be or otherwise include a machine-learned object state estimation model (e.g., a specifically trained instance of the model, a generalized instance of the model, etc.) that includes an estimation portion and a refinement portion (e.g., one or more refinement submodels, etc.). To follow the previous example, the left hand segment refinement portion 508B can be trained to process a specific portion of an object (e.g., a left hand of a body, etc.). As a more particular example, the estimation portion 502 can segment the image data 402 into a plurality of segments 506A-506D, and can provide each of the segments 506A-506D to a respective segment refinement portion 508A-508D. An estimation portion of the head segment refinement model 508A can process the segment 506A (e.g., a segment of the image data 402, etc.) to obtain an initial estimated state of the object segment 506A and context data associated with the object segment 506A. The refinement portion of the segment refinement portion 508A can then process the initial estimated state of the object 5086A and the context data to obtain a final object state estimate 510A for the object segment 506A.

Each of the segment refinement portions 508A-508D can generate final object segment state estimates 510A-510D respectively for the object segments 506A-506D. In some implementations, an attention mechanism can be employed synergistically with the segment refinement portions 508A-508D to optimize the segmented processing of the body segments 506A-506D. Based on each of the final object segment state estimates 510A-510D, a final object state estimate 512 can be determined. For example, the final object state estimate 512 can be determined by fusing each of the final object segment state estimates 510A-510D to generate the final object state estimate 512 (e.g., using any conventional fusing technique for three-dimensional representations, etc.).

Example Methods

Figure 6:
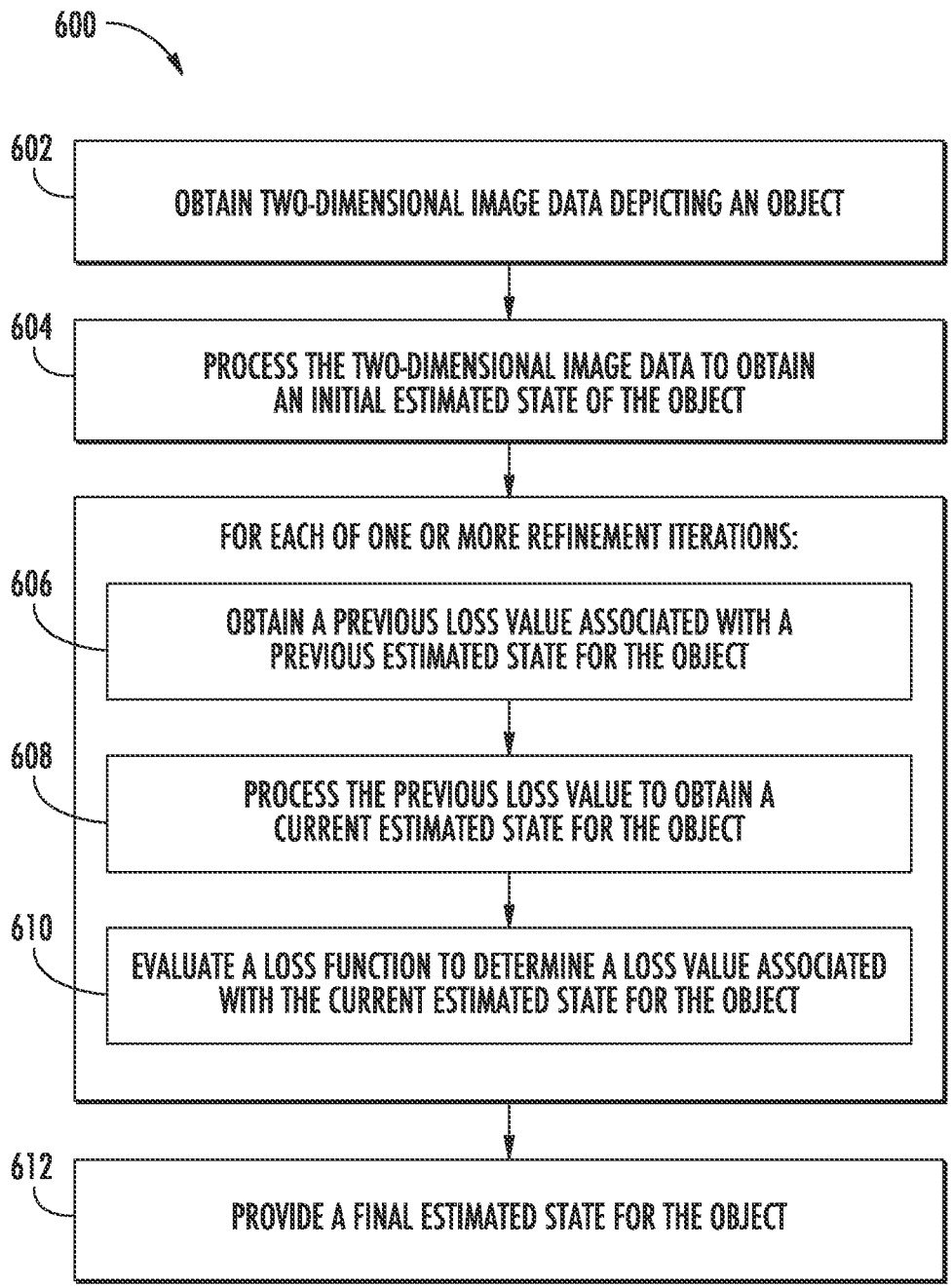
FIG. 6 depicts a flow chart diagram of an example method to perform object state estimation according to example embodiments of the present disclosure.

FIG. 6 depicts a flow chart diagram of an example method 600 to perform object state estimation according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain two-dimensional image data depicting an object. More particularly, the computing system can two-dimensional image data (e.g., one or more two-dimensional images, a monocular two-dimensional RGB image, two-dimensional video data, two-dimensional sensor data, two-dimensional LIDAR data, etc.) that depicts an object (e.g., a human body, furniture, clothing, etc.). In some implementations, the object can include one or more object segments. An object segment can be or otherwise include any specific portion of the object. As an example, the object can be a human body. The body segments for the body can include any specific portion of the body (e.g., feet, hand(s), arm(s), head, leg(s), torso, etc.). As another example, the one or more body segments may include a torso segment, a head segment, two leg segments, two arm segments, and a full-body segment. As yet another example, the one or more body segments may include the entire body as one segment. It should be noted that the object included or otherwise depicted by the two-dimensional image data may not include every segment of the object. As an example, the image data may only depict one half of the particular object (e.g., the upper half of a human body, a specific segment of a furniture object, etc.).

In some implementations, the two-dimensional image data can depict the object based at least in part on one or more camera parameter(s). As an example, the two-dimensional image data can depict the object based on a perspective that corresponds to a pinhole camera with intrinsics $C=[f_x, f_y, c_x, c_y]^T$ and associated perspective projection operator $x_{2d}=\Pi(x_{3d}, C)$, where $x_{3d}$ is any three-dimensional point. As another example, during training and/or testing of the model, intrinsics for the full input image can be approximated such that $f_x$=max(H, W), $f_y$=max(H, W), $c_x$=W/2, $c_y$=H/2, where H, W are the input dimensions.

In some implementations, the two-dimensional image data can include one or more bounding boxes that correspond to the depicted object and/or the one or more segments of the depicted object. In some implementations, the two-dimensional image data can be or can otherwise be resized to a certain size. As an example, the two-dimensional image data can be or can be resized to a fixed size of 480×480. The intrinsics C of the two-dimensional image data can then be warped into corresponding crop intrinsics $C_c$ such that:

$$[C_c^T 1]^T = K[C^T 1]^T$$

where $K \in \mathbb{R}^{5\times5}$ can represent the scale and translation matrix, adapting the image intrinsics C. By using cropped intrinsics, the state of the 3D model can be solved for (e.g., including global scene translation, etc.) in the camera space of the two-dimensional image data.

In some implementations, for multiple detections in the same two-dimensional image data, processing the two-dimensional image data with the machine-learned object state estimation model can generate a three-dimensional representation (e.g., a 3D mesh, etc.) that is estimated relative to a common world coordinate system into the same three-dimensional scene. As an example, at test time when switching $C_c$ with C, the three-dimensional object state estimation (e.g., a model projection, etc.) can also align with the corresponding object layout in the two-dimensional image data.

Additionally, or alternatively, in some implementations, the one or more segments of the object can include item(s) of clothing for a body. For example, the object can be a human body, and the one or more segments of the body may include a right leg segment, a left leg segment, and a clothing segment associated with the right and left leg segments (e.g., pants, shorts, leggings, a dress, a skirt, etc.). As another example, the one or more segments may include a feet segment and an associated clothing segment (e.g., shoes, sandals, etc.). As such, it should be broadly understood that the one or more segments can include any articles of clothing and/or ornamentation (e.g., jewelry, a watch, a hat, etc.) that can be associated with a body object.

At 604, the computing system can process the two-dimensional image data to obtain an initial estimated state of the object. More particularly, the computing system can process, with an estimation portion of a machine-learned object state estimation model, the two-dimensional image data to obtain an initial estimated state of the object. As an example, the estimation portion of the machine-learned object state estimation model can process the two-dimensional image data to obtain an initial estimated state of the object s=$[\theta^T, \beta^T, r^T, t^T]^T$. In some implementations, the estimation portion of the machine-learned object state estimation model (e.g., one or more convolutional neural networks, a multi-stage subnetwork, etc.) can process the two-dimensional image data to obtain features $F \in \mathbb{R}^{60\times60\times256}$, keypoint detection heatmaps $K \in \mathbb{R}^{60\times60\times137}$, and body segment segmentation maps $B \in \mathbb{R}^{60\times60\times15}$. These features, keypoint detection heatmaps, and/or body segment segmentation maps can be embedded into a low-dimensional space using the estimation portion of the model to obtain context data. For example, the estimation portion of the model can process the two-dimensional image data to obtain context data represented as a code vector $s^c$, where c represents the optimization's objective function context. Additionally, in some implementations, the camera intrinsics can be included in the context data. Additionally, or alternatively, in some implementations, the estimation portion may resize the two-dimensional image data before processing the image data (e.g., resizing the image from a first size to 480×480 pixels, etc.).

At 606, the computing system can, for each of one or more iterations, obtain a previous loss value associated with a previous estimated state for the object. More particularly, the computing system can, for each of one or more iterations, obtain a previous loss value (e.g., determined based at least in part on one or more keypoints of the object of the two-dimensional image data, etc.) associated with a previous estimated state for the object At 608, the computing system can, for each of one or more iterations, process the previous loss value to obtain a current estimated state of the object. More particularly, the computing system can, for each of one or more iterations, process, with a refinement portion of the machine-learned object state estimation model, the previous loss value to obtain a current estimated state of the object. As a more particular example, to utilize the refinement portion of the machine-learned object state estimation model, the refinement portion can include one or more recurrent neural network(s) a Recurrent Neural Network module $RNN_\delta(s^c, s_i, m_i)$, where $m_i$ can represent the internal memory data (e.g., a hidden memory state) of the network at a refinement iteration i, and can unroll the updates into M stages:

$$\begin{bmatrix} s_i \\ m_i \end{bmatrix} = RNN_\delta(s_{i-1}, m_{i-1}, L_u^{i-1}, s^c)$$

At 610, the computing system can, for each of one or more iterations, evaluate a loss function to determine a loss value associated with the current estimated state of the object. More particularly, the computing system can, for each of one or more iterations, evaluate a loss function to determine a loss value associated with the current estimated state of the object. The loss at each iteration i can be determined in a variety of ways. As an example, if two-dimensional and/or three-dimensional ground truth data associated with the two-dimensional image is available, the ground truth data can be utilized to determine the loss at each refinement iteration. Alternatively, if annotated training data is not available, each refinement stage can employ self-supervision in the training stage of the machine-learned object state estimation model.

As an example, the loss determined by evaluating the loss function at each refinement iteration i can be represented as:

$$L_u^i(s,K,B) = \lambda_k L_k(s_i,K) + \lambda_b L_b(s_i,B) + l(\theta_i, \beta_i),$$

Where l=−log(p), $L_k$ can represent a 2D keypoint alignment loss, $L_b$ can represent a 2D semantic body part alignment (e.g., defined in terms of differentiable rendering, etc.), and M can represent the total number of training LSTM stages, while $\lambda_k$ and $\lambda_b$ can represent cross-validated scalar values which balance the loss terms.

In some implementations, the current estimated state of the object can be or otherwise include a three-dimensional representation of the object, and the keypoint alignment loss, $L_k$, can measure the reprojection error of the 3D portions of the current estimated state of the object with regards to the predicted 2D keypoints. This loss can, in some implementations, be defined as the 2D mean-per-segment position error (MPSPE). As an example, the object can be a human body that includes a plurality of joint segments (e.g., elbows, knees, etc.). The keypoint alignment loss $L_k$ can measure the reprojection error of the 3D joint segments and predicted 2D joint keypoints. This keypoint alignment loss can be represented as:

$$L_k(s_t, K) = \frac{1}{N_j}\sum_i^{N_j} \|j_i(K) - \Pi(J_i(s_t), C_c)\|_2.$$

with $N_j$ keypoints. Additionally, $j_i(K)$ can represent the 2D location of the i-th 2D keypoint extracted from the K heatmap, and $J_i(s_t)$ can represent the i-th 3D keypoint computed by posing the object model (e.g., the final estimated state of the object, etc.) at $s_t$.

In some implementations, the loss can include an object alignment loss $L_b$. As an example, the object alignment loss can utilize a current prediction $s_t$ to create an object-segment semantic segmentation image $I(M(s_t), C_c) \in \mathbb{R}^{H \times W \times 15}$. To follow the previous example, a soft differentiable rasterization process can be followed to fuse probabilistic contributions of all predicted mesh triangles of the final estimated state for the object with respect to the rendered pixels. In such fashion, gradients can flow to the occluded and far-range vertices.

In some implementations, to be able to aggregate occlusion states and semantic information, each mesh vertex of the final estimated state of the object can be appended to its semantic label as a one-hot vector $\{0,1\}^{15 \times 1}$, and a constant alpha value of 1. The target object segment semantic probability maps B can also be appended with a visibility value equal to the foreground probability $\in [0,1]^{H \times W \times 1}$. The loss can represent the mean-per-pixel absolute value of the difference between the estimated and predicted semantic segmentation maps of the object as represented by:

$$L_b(s_t, B) = \frac{1}{HW}\sum_i^{HW} \|B_i - I(M(s_t), C_c)_i\|_1.$$

In some implementations, for object shape and pose, two regularizers can be included. As an example, the regularizers can be proportional to the negative log-likelihood of their associated Gaussian distributions as represented by:

$l(\theta) = -\log p(\theta) = \|\theta\|_2^2, l(\beta) = -\log p(\beta) = \|\beta\|_2^2.$ In some implementations, three-dimensional, fully supervised training data can be available for determination of the loss. As an example, the following unit training loss $L_f^i$ can be utilized. Additionally, or alternatively, additional unit training losses described previously can be utilized alongside the unit training loss as represented by:

$L_f^i(s) = \lambda_m L_m(M(s_i), \tilde{M}) + \lambda_{3d} L_{3d}(J(s_i), \tilde{J})$ Where $L_m$ can represent a 3D vertex error between the ground-truth mesh $\tilde{M}$ and a predicted object state estimate. $M(s_i)$—can be obtained by posing the object state estimation using the predicted state $s_i$. $L_{3d}$ can represent the 3D MPSPE between the 3D joints recovered from predicted object state parameters $J(s_i)$. Ground-truth 3D joints (e.g., $\tilde{J}$, $\lambda_m$, $\lambda_{3d}$, etc.) can represent the scalar values that balance the two terms.

At 612, the computing system can provide a final estimated state for the object. More particularly, following the one or more refinement iterations, a final estimated state for the object can be provided based at least in part on a final refinement iteration of the one or more refinement iterations. As an example, the final estimated state for the object may be provided by the machine-learned object state estimation model at a final refinement iteration of the one or more refinement iterations. In some implementations, the final estimated state of the object may be or otherwise include three-dimensional pose data. Additionally, or alternatively, in some implementations the final estimated state of the object may be or otherwise include three-dimensional mesh comprising one or more pose variables and one or more state variables.

As an example, the object can be a body. The final estimated state for the object can include pose state variables $\theta \in \mathbb{R}^{N_p \times 1}$ and shape state variables $\beta \in \mathbb{R}^{N_s \times 1}$, where $N_p$ can represent the number of posing variables and $N_s$ can represent the length of the shape code. To follow the previous example, the final estimated state for the object can be or otherwise include a posed mesh $M(\theta, \beta)$ which can include $N_v$ associated 3D vertices $V = \{v_i, i=1 \ldots N_v\}$ with fixed topology. The rigid transformation of the model in camera space can be represented by a 6D rotation $r \in \mathbb{R}^{6 \times 1}$ and a translation vector $t \in \mathbb{R}^{3 \times 1}$. As such, the final estimated state for the object (e.g., a posed mesh representation, etc.) can be represented as $M(\theta, \beta, r, t)$.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for estimation of an object state from image data, the method comprising:
obtaining, by a computing system comprising one or more computing devices, two-dimensional image data depicting an object;
processing, by the computing system with an estimation portion of a machine-learned object state estimation model, the two-dimensional image data to obtain an initial estimated state of the object;

performing, by the computing system, a plurality of refinement iterations to generate a final estimated state for the object, wherein performing a refinement iteration comprises:
  obtaining, by the computing system, a previous loss value associated with a previous estimated state for the object, wherein the previous estimated state for the object is generated using a previous refinement submodel of a plurality of refinement submodels of a refinement portion of the machine-learned object state estimation model;
  processing, by the computing system with a current refinement submodel of the plurality of refinement submodels, a set of inputs to obtain a current estimated state of the object, wherein the set of inputs comprises:
    the initial estimated state of the object;
    the previous loss value; and
    internal memory data from the previous refinement submodel, wherein the internal memory data is descriptive of an internal memory state of the previous refinement submodel after being used to generate the previous estimated state for the object; and
  evaluating, by the computing system, a loss function to determine a loss value associated with the current estimated state of the object; and
providing, by the computing system based at least in part on a final refinement iteration of the one or more refinement iterations, a final estimated state for the object, wherein the final estimated state for the object comprises data descriptive of a three-dimensional representation of the object.

2. The computer-implemented method of claim 1, wherein the method further comprises:
  evaluating, by the computing system, a loss function that evaluates a difference between the final estimated state for the object and ground truth data associated with the two-dimensional image data; and
  adjusting, by the computing system based at least in part on the loss function, one or more parameters of at least one of the estimation portion or the refinement portion of the machine-learned object state estimation model.

3. The computer-implemented method of claim 2, wherein the ground truth data comprises one or more annotations of the two-dimensional image data.

4. The computer-implemented method of claim 2, wherein the ground truth data is based at least in part on the initial estimated state of the object.

5. The computer-implemented method of claim 1, wherein:
  the plurality of refinement submodels are respectively associated with the plurality of refinement iterations.

6. The computer-implemented method of claim 1, wherein the set of inputs further comprises context data.

7. The computer-implemented method of claim 6, wherein, prior to the plurality of refinement iterations, the method comprises:
  processing, by the computing system with the estimation portion of the machine-learned object state estimation model, the two-dimensional image data to obtain the context data.

8. The computer-implemented method of claim 1, wherein each of the plurality of refinement submodels comprises a recurrent neural network.

9. The computer-implemented method of claim 1, wherein:
  the object comprises one or more object segments; and
  the initial estimated state of the object comprises one or more respective initial estimated states of the one or more object segments;
  the machine-learned object state estimation model comprises one or more segment refinement portions respectively associated with the one or more object segments.

10. The computer-implemented method of claim 9, wherein:
  for each of the one or more object segments:
    for each of plurality of refinement iterations:
      obtaining the previous loss value associated with the previous estimated state for the object comprises obtaining, by the computing system, a previous loss value associated with a previous estimated state of a respective object segment of the one or more object segments, wherein the previous estimated state for the object segment is generated using a previous refinement submodel of the plurality of refinement submodels of the refinement portion of the machine-learned object state estimation model;
      processing the previous loss value to obtain the current estimated state of the object comprises processing, by the computing system with a respective segment refinement portion of one or more segment refinement portions, the previous loss value to obtain a current estimated state of the respective object segment; and
      evaluating the loss function to determine the loss value comprises evaluating, by the computing system, a respective loss term of one or more loss terms of the loss function to determine a loss value associated with the current estimated state of the respective object segment, wherein the one or more loss terms are respectively associated with the one or more object segments.

11. The computer-implemented method of claim 10, wherein prior to providing the final estimated state for the object, the method comprises fusing, by the computing system, one or more respective final estimated states for the one or more object segments to obtain the final estimated state for the object.

12. The computer-implemented method of claim 1, wherein the final estimated state for the object comprises three-dimensional pose data.

13. The computer-implemented method of claim 1, wherein the final estimated state for the object comprises a three-dimensional mesh comprising one or more pose variables and one or more state variables.

14. The computer-implemented method of claim 1, wherein the estimation portion of the machine-learned object state estimation model comprises one or more convolutional neural networks.

15. The computer-implemented method of claim 1, wherein the object comprises a human body.

16. A computing system for estimation of an object state from image data, comprising:
  one or more processors;
  one or more tangible, non-transitory computer readable media storing computer-readable instructions that when executed by the one or more processors cause the one or more processors to perform operations, the operations comprising:
    processing, with an estimation portion of a machine-learned object state estimation model, two-dimensional image data depicting an object to obtain an initial estimated state of the object;

performing a plurality of refinement iterations to generate a final estimated state for the object, wherein performing a refinement iteration comprises:

obtaining a previous loss value associated with a previous estimated state for the object, wherein the previous estimated state for the object is generated using a previous refinement submodel of a plurality of refinement submodels of a refinement portion of the machine-learned object state estimation model;

processing, with a current refinement submodel of the plurality of refinement submodels, a set of inputs to obtain a current estimated state of the object, wherein the set of inputs comprises:

the initial estimated state of the object;

the previous loss value; and internal memory data from the previous refinement submodel, wherein the internal memory data is descriptive of an internal memory state of the previous refinement submodel after being used to generate the previous estimated state for the object; and evaluating a loss function to determine a loss value associated with the current estimated state of the object;

determining, based at least in part on a final refinement iteration of the one or more refinement iterations, a final estimated state for the object, wherein the final estimated state for the object comprises data descriptive of a three-dimensional representation of the object; and adjusting, based at least in part on a loss function, one or more parameters of the machine-learned object state estimation model, wherein the loss function is configured to evaluate a difference between the final estimated state for the object and ground truth data associated with the two-dimensional image data.

17. The computing system of claim 16, wherein the ground truth data is based at least in part on the initial estimated state of the object.

18. The computing system of claim 16, wherein:
the plurality of refinement submodels are respectively associated with the plurality of refinement iterations.

19. The computing system of claim 16, wherein:
the object comprises one or more object segments;
the initial estimated state of the object comprises one or more respective initial estimated states of the one or more object segments; and
the machine-learned object state estimation model comprises one or more segment refinement portions respectively associated with the one or more object segments.

20. One or more tangible, non-transitory computer readable media storing computer-readable instructions that when executed by one or more processors cause the one or more processors to perform operations, the operations comprising:

obtaining two-dimensional image data depicting an object;

processing, with an estimation portion of a machine-learned object state estimation model, the two-dimensional image data to obtain an initial estimated state of the object;

performing a plurality of refinement iterations to generate a final estimated state for the object, wherein performing a refinement iteration comprises:

obtaining a previous loss value associated with a previous estimated state for the object, wherein the previous estimated state for the object is generated using a previous refinement submodel of a plurality of refinement submodels of a refinement portion of the machine-learned object state estimation model;

processing, with a current refinement submodel of the plurality of refinement submodels, a set of inputs to obtain a current estimated state of the object, wherein the set of inputs comprises:

the initial estimated state of the object;

the previous loss value; and internal memory data from the previous refinement submodel, wherein the internal memory data is descriptive of an internal memory state of the previous refinement submodel after being used to generate the previous estimated state for the object; and evaluating a loss function to determine a loss value associated with the current estimated state of the object; and providing, based at least in part on a final refinement iteration of the one or more refinement iterations, a final estimated state for the object, wherein the final estimated state for the object comprises data descriptive of a three-dimensional representation of the object.

* * * * *